June 25, 1946.   O. J. HUELSTER   2,402,627
CAP FOR SNAP FASTENERS

Filed March 1, 1944

INVENTOR
OTTO J. HUELSTER
BY
ATTORNEY

Patented June 25, 1946

2,402,627

UNITED STATES PATENT OFFICE 2,402,627

CAP FOR SNAP FASTENERS

Otto J. Huelster, Waterbury, Conn., assignor to Scovill Manufacturing Company, Waterbury, Conn., a corporation of Connecticut Application March 1, 1944, Serial No. 524,825

9 Claims. (Cl. 24—216)

This invention relates to snap fastener installations of the type and kind employing sockets having yieldable portions and with which conventional stud-like elements are adapted to be coupled and uncoupled. More particularly, the present invention relates to the construction of the socket portion of fasteners of this kind and, more directly, to the structure of a cap or pronged member employed in securing the socket to a suitable support. The novel features of the invention will be best understood from the following description, when taken together with the accompanying drawing, in which certain embodiments of the invention are disclosed, and in which the separate parts are designated by suitable reference characters in each of the views and in which:

Figure 1:
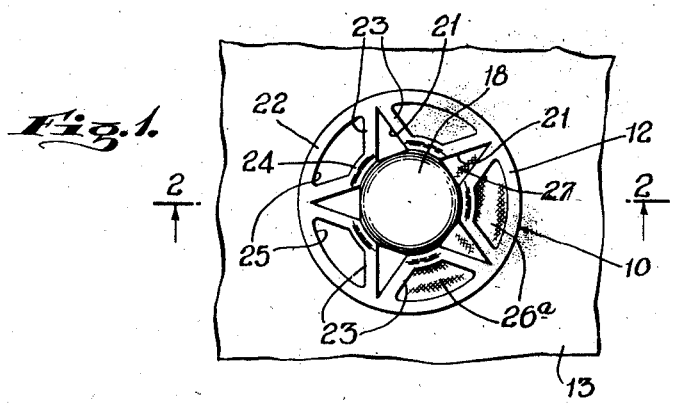
Fig. 1 is a plan view showing the cap side of a socket member as attached to a support.

The present application constitutes a continuation-in-part of a prior application filed by me February 8, 1944, bearing Serial Number 521,741, and the present application deals with the provision of apertured or open-work peripheral portions on the cap and intermediate the cutouts formed in the cap, in producing the prongs, for the purpose of more securely retaining the cap in connection with the support, and particularly, in keying the cap against shifting on the support. Still further, the exposure of the support through the cap also materially minimizes the strain upon the cap or fastener as a whole in passing the fastener through laundering machines of various kinds or classes.

Still further, a cap made according to my present invention may be said to have a rim-like periphery adapted to be embedded in the support and joining the central body portion or hub in spoke-like members. Thus it may be further said that the cap has the general structure of a wheel-like member.

In the accompanying drawing, 10 represents the socket member as a whole. This member is composed of a socket part 11 and a cap part 12. These parts are secured together and to a suitable support 13 by a number of prongs 14 cut from the part 12 and piercing the support 13 with the ends of the prongs bent and flared outwardly into inturned peripheral flange portions 15 on the part 11.

The part 11 is in the form of a ring-like body having in the bore thereof a plurality of spring arms 16, the inner ends of which terminate in inwardly projecting flanges 17 adapted to engage conventional stud parts, as in other snap fasteners of the kind and class under consideration. The stud is not shown, as it forms no part of this invention and, as the socket part 11 is substantially the same as the corresponding part in the prior application hereinbefore referred to, no further specific description will herein be made.

The cap part 12 is, as before stated, more or less wheel-like in construction and comprises a central domed hub portion 18 terminating at the periphery thereof in an indenture 19 which forms a corresponding projection 20 on the inner surface of the cap, at least intermediate the apertures 21. The apertures 21 are formed by cutting the prongs 14 from the cap, as will be apparent.

At the periphery of the cap 12 is an annular rim portion 22; this rim portion joins the hub by spaced pairs of spokes 23, each pair forming boundary walls of the apertures 21. Inner ends of the pair of spokes are joined by flange portions 24 which constitute part of the hub or what might be said to be flanges extending from the offset 19 of the hub 18.

Between the rim 22 and flanges 24 and the spaced pairs of spokes 23 are a plurality of circumferentially spaced key apertures 25. These apertures are arranged above the rounded portions 26 of the inturned flange 15 of the socket and it will thus be apparent that, in securing the socket and cap parts together, the fabric or material of a flexible support will be bulged or extended into the key apertures 25 as indicated, for example, at 26a in Fig. 2 of the drawing. The support will also extend slightly into the apertures 21, as seen at 27 in Fig. 2, for the same purpose, but a greater keying effect is established in the apertures 25 to prevent rotary shifting of the wheel-like cap on the support, thus preventing any strain of the prongs 14 on the support to cut or shear the support which might tend to loosen or even displace the socket member therefrom.

Figure 2:
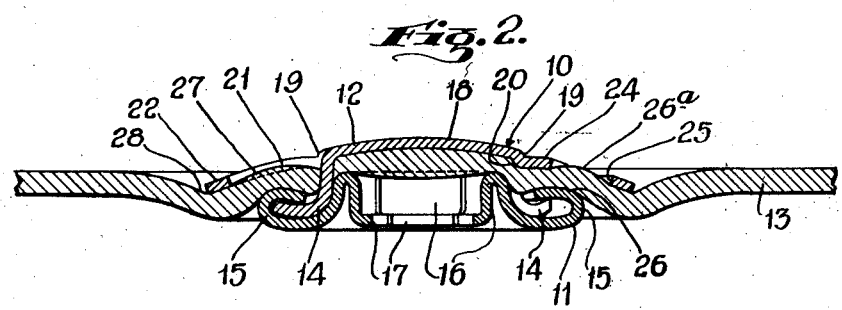
Fig. 2 is a section on the line 2—2 of Fig. 1 on an enlarged scale.
Figure 3:
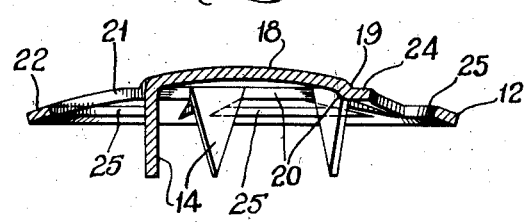
Fig. 3 is a sectional view similar to Fig. 2 showing the cap in detached position with the prongs of the cap in the position assumed thereby, prior to the coupling with the socket part, as illustrated in Fig. 2.

It will be understood that the spokes of the cap are on a curvature substantially similar to the curvature of the domed hub portion 18, but offset with respect thereto by the indenture 19 and the rim of the wheel is thus offset and, in its entirety, is disposed below the dome portion and overlaps part of the inturned flange 15 of the socket member. This establishes a very compact embedment of the socket member in the support and, furthermore, embeds the rim portion 22 in the support, as indicated at 28 in Fig. 2 of the drawing. It will, of course, be apparent that the illustration in Fig. 2 is very much enlarged and the degree of the depression is probably somewhat exaggerated. This inwardly depressed rim portion also serves to freely guide the socket member through laundering machinery or equipment of various types and kinds.

It will thus be understood that, with a wheel-like cap structure, greater flexibility is provided in the entire socket member, adapting the socket member to flexures without distortion to the cap which would not otherwise be possible. In certain types of metals and, in certain plastic materials, the spokes would actually become resilient members, resiliently supporting the ring-like rim or peripheral edge of the cap. In referring to plastics, it will be apparent that the entire device may be composed of plastics or the two parts of the socket member may be composed of combinations of plastic and metallic members. When the cap is composed of plastic material, it may be essential to pre-pierce a support for admission of the prongs and further to pre-heat the prongs to facilitate bending thereof, but when coupled, the bent or flexed prongs will maintain the flexed or bent positions.

It will be apparent from a consideration of Fig. 1 of the drawing that the pairs of spokes converge outwardly or in the direction of the rim, at least to the extent that inner adjacent edges or walls of the spokes converge toward each other. This construction forms a substantial support of the rim and, at the same time, produces relatively large key apertures in the wheel-like cap member for the purposes stated. Furthermore, the flanges joining outer spokes of adjacent pairs also reinforce the wheel structure as a whole.

Having fully described my invention, what I claim as new and desire to secure by Letters Patent is:

1. In snap fasteners, a cap part comprising a wheel-like body, said body having a central hub portion, an annular rim portion offset in its entirety with respect to the inner surface of the hub portion, circumferentially spaced spoke members joining the rim portion with the hub portion, and a plurality of prong members arranged at and extending angularly to the periphery of said hub portion.

2. In snap fasteners, a cap part comprising a wheel-like body, said body having a central hub portion, an annular rim portion, circumferentially spaced spoke members joining the rim portion with the hub portion, a plurality of prong members arranged at and extending angularly to the periphery of said hub portion, said spoke members being arranged in pairs, and the spoke members of each pair converging in the direction of said rim portion.

3. In snap fasteners, a cap part comprising a wheel-like body, said body having a central hub portion, an annular rim portion, circumferentially spaced spoke members joining the rim portion with the hub portion, a plurality of prong members arranged at and extending angularly to the periphery of said hub portion, said spoke members being arranged in pairs, the spoke members of each pair converging in the direction of said rim portion, and the outer spoke member of one pair joining the outer spoke member of an adjacent pair in a flange portion integral with the periphery of and partially forming said hub portion.

4. A cap for snap fasteners of the character described, said cap comprising a wheel-like member, said member having a central domed hub, a plurality of spokes spaced circumferentially of and extending outwardly from said hub, an annular rim joining outer ends of said spokes, said rim being offset in its entirety with respect to the domed hub portion, and said member including means for attaching the same to a suitable support.

5. A cap for snap fasteners of the character described, said cap comprising a wheel-like member, said member having a central domed hub, a plurality of spokes spaced circumferentially of and extending outwardly from said hub, an annular rim joining outer ends of said spokes, said rim being offset in its entirety with respect to the domed hub portion, said member including means for attaching the same to a suitable support, said spokes being arranged in circumferential pairs, and the spokes of each pair having adjacent walls converging in the direction of said rim.

6. A cap for snap fasteners of the character described, said cap comprising a wheel-like member, said member having a central domed hub, a plurality of spokes spaced circumferentially of and extending outwardly from said hub, an annular rim joining outer ends of said spokes, said rim being offset in its entirety with respect to the domed hub portion, said member including means for attaching the same to a suitable support, said spokes being arranged in circumferential pairs, the spokes of each pair having adjacent walls converging in the direction of said rim, and said means comprising circumferentially spaced prongs at the periphery of said hub.

7. A cap for snap fasteners of the character described, said cap comprising a wheel-like member, said member having a central domed hub, a plurality of spokes spaced circumferentially of and extending outwardly from said hub, an annular rim joining outer ends of said spokes, said rim being offset in its entirety with respect to the domed hub portion, said member including means for attaching the same to a suitable support, said spokes being arranged in circumferential pairs, the spokes of each pair having adjacent walls converging in the direction of said rim, said means comprising circumferentially spaced prongs at the periphery of said hub, and the spaced pairs of spokes forming circumferentially spaced key apertures on said member outwardly of the hub.

8. A cap for snap fasteners of the character described, said cap comprising a wheel-like member, said member having a central domed hub, a plurality of spokes spaced circumferentially of and extending outwardly from said hub, an annular rim joining outer ends of said spokes, said rim being offset in its entirety with respect to the domed hub portion, said member including means for attaching the same to a suitable support, said spokes being arranged in circumferential pairs, the spokes of each pair having adjacent walls converging in the direction of said rim, and said spokes being curved longitudinally.

9. A cap for snap fasteners, said cap comprising an imperforated center portion and an annular marginal portion, means spaced circumferentially of the center portion and marginal portion for uniting the marginal portion with the center portion, said means being widely spaced to form circumferentially spaced key apertures between the marginal and center portions, said means being offset with respect to the center portion to dispose the marginal portion to one side of the center portion, and means on the cap for securing the same to a suitable support.

OTTO J. HUELSTER.